Nov. 3, 1936.                R. N. SHIRAS                2,059,494
                       METHOD OF RECTIFICATION
                         Filed July 25, 1935
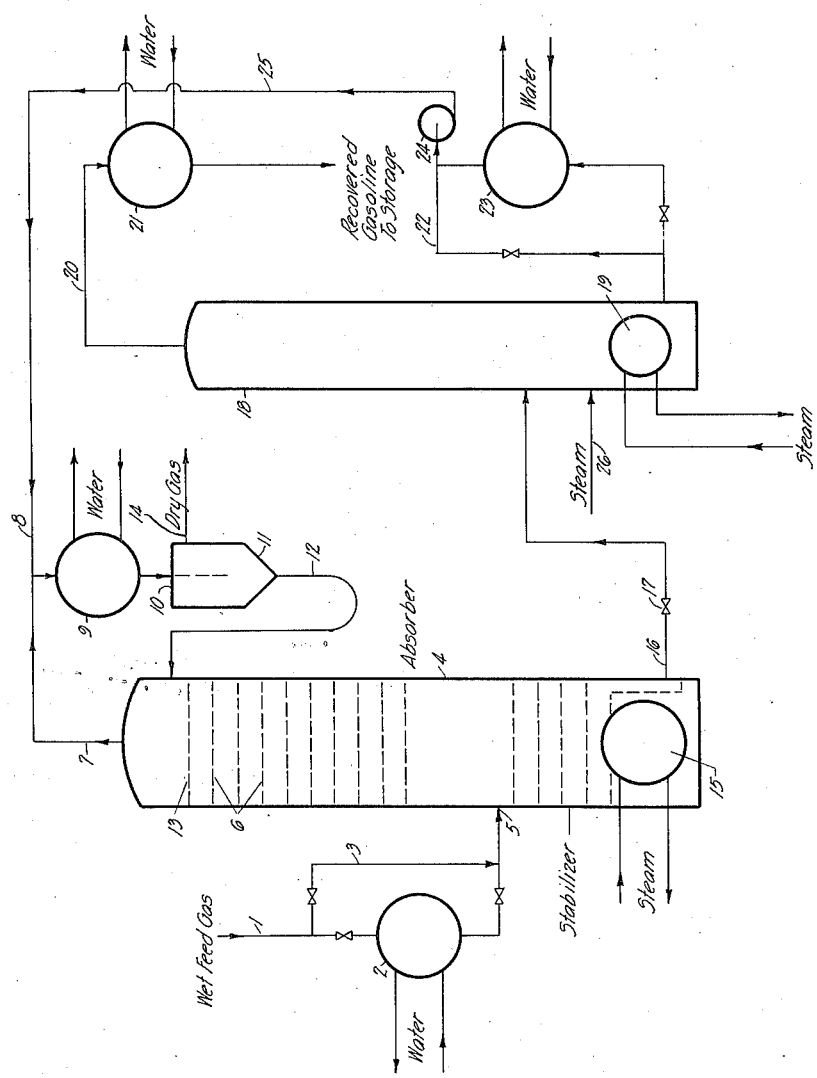
Inventor: Russell Norman Shiras
By his Attorney:

Patented Nov. 3, 1936

2,059,494

UNITED STATES PATENT OFFICE 2,059,494

METHOD OF RECTIFICATION

Russell Norman Shiras, Compton, Calif.

Application July 25, 1935, Serial No. 33,103

2 Claims. (Cl. 196—8)

This invention deals with the fractionation of so-called wet gases into normally gaseous and normally liquid components. Specifically, it is concerned with a novel method of producing natural reflux in the fractionating column of a distillation system in which the top product is a normally non-condensable gas.

It is an object of this invention to provide means, whereby liquefiable components of wet gases can be separated economically and sharply from normally gaseous components. As applied to hydrocarbon gases it is the object of the invention to enable the production of stabilized recovery gasolines in substantially theoretical yields in a manner which is more simple and inexpensive than has been possible heretofore.

Wet gases are gases containing components which are liquefiable under normal temperature and pressure conditions. The amount of liquefiable material which can be held in solution of a gas depends upon the temperature and pressure of the gas and the fugacity of the liquefiable material. The laws governing the reciprocal solubilities of vapors and gases are generally known and require no discussion.

The problem of economically recovering liquids dissolved in gases is most urgent in the petroleum industry, the huge quantities of natural and cracked gases which are produced daily containing millions of gallons of recoverable gasoline. In other chemical industries the problem exists also, though to a lesser degree. Valuable products are frequently carried away by waste or other gases and could be recovered, if economical means were available. While in the following discussion I am mostly concerned with the processing of wet hydrocarbon gases, it shall be understood that I do not intend to limit myself thereto, my invention being applicable to any gas containing in solution substantial amounts of liquefiable components.

Of the methods developed to date for the above type of separation the process involving the application of a liquid absorption medium or menstruum has proven the most effective and flexible. Until recently the absorption process had to be carried out in three separate steps, namely;

(1) Absorption of liquefiable components of the gas;

(2) separation of absorbed components from absorbing menstruum, viz, distillation;

(3) removal of normally gaseous components from the products recovered under 2, viz, stabilization.

Recent developments have enabled the combination of steps 1 and 3 and my invention comprises an improved and novel process in which absorption and stabilization are combined in a single operation followed by distillation.

The equipment which I employ to carry out my invention is of the type used for fractional distillation. It is well known that in a fractional distilling operation a sharp separation can be obtained only, if, among other requisites, a sufficient amount of natural reflux is returned to the top of the fractionating column, said reflux, as the name "natural" indicates, being produced by a total or partial condensation of the top product. This requirement should be satisfied, even if the fractionating column is designed for most efficient operation. In the separation of liquids from gases, the top product of the fractionating column is a gas, which may be of such a composition to make its liquefaction for the purpose of producing a liquid reflux impractical. In some instances the process may be carried out under sufficient superatmospheric pressure to enable the liquefaction of the normally gaseous top product, but such methods, if practical, are usually expensive with regard to both equipment and operation.

In my novel method I produce a natural reflux from a gaseous top product without having to resort to excessively high pressures, by contacting the top product with an absorption oil in a cooling zone in a manner to saturate the absorption oil with gaseous components. The fat oil produced thereby is used as reflux, and the gaseous components dissolved therein play the part of the natural reflux.

For instance, top gases and absorption oil are conducted preferably in concurrent flow through a water cooled condenser of conventional design. Concurrent flow of gas and absorption oil is preferred over countercurrent flow because the danger of channeling is eliminated and because of better cooling efficiency due to a more favorable heat distribution in the condenser. As the two fluids meet, heat of absorption is developed resulting in a temperature rise which may be of the order of 10–40° F. The rise in temperature varies with the composition of the gas and the absorption oil and with the pressure, at higher pressures more heat being developed. This heat is immediately carried away in the condenser, resulting in the absorption of an additional quantity of gaseous hydrocarbons which may be of the order of 20 to 50% of the amount which is absorbable before cooling. The amount of heat developed under these conditions indicates that an actual condensation of normally non-condensable hydrocarbons takes place.

Normally the top gases consist of a mixture comprising methane, ethane, propane, butanes and their corresponding olefines, although olefines and occasionally certain of the other normally gaseous hydrocarbons may be absent. Since the quantity of an individual hydrocarbon which is absorbed is governed not only by its partial pressure but also by its fugacity, the absorbed gas usually does not have the same quantitative composition as the gas which is brought in contact with the absorption oil. The heavier hydrocarbons of lower fugacity are absorbed in preference to the light ones, and consequently the absorbed gas is heavier than the overhead gas. The theoretical requirements characterizing a normal natural reflux, however, are met nevertheless, the resulting natural reflux effecting a satisfactory fractionation.

After passage through the condenser, unabsorbed dry gas and absorption oil are separated in a trap, dry gas is withdrawn and absorption oil substantially saturated with normally gaseous hydrocarbons enters a fractionating column at its top plate and flows in countercurrent to ascending gases, stripping them of normally liquid hydrocarbons. During the descent an exchange of absorbed hydrocarbons takes place, light ones being displaced by heavier ones in a manner similar to the exchange taking place during an ordinary fractional distillation in the presence of normal reflux but in the absence of a third heavier component. The normally gaseous hydrocarbons, absorbed by the absorption oil in the condenser, then behave exactly like a normal reflux, vaporizing while vaporous heavier hydrocarbons are condensed. The absorption oil, acting merely as a carrier, can be considered part of the reflux, and for this reason the saturated absorption oil entering at the top plate of the column is spoken of as total reflux.

The wet feed gas enters the column at an intermediate point between top and bottom. As the fat absorption oil travels downward and passes this point it contains practically all of the liquefiable gas components as well as some normally gaseous ones. To remove the latter, the rich absorption oil is conducted through a stabilizing zone, at the bottom of which there is a reboiler capable of supplying enough heat to vaporize all of the normally gaseous and some of the normally liquid hydrocarbons. The vapors produced in this manner are allowed to rise in countercurrent to fat absorption oil, gradually stabilizing the latter on its way down, and to join the wet feed gases near their point of entrance. The fat absorption oil, when reaching the bottom of the heating zone, is fully stabilized and is withdrawn from the column to be fractionally distilled for the purpose of stripping and recovering absorbed normally liquid hydrocarbons therefrom. The stripped absorption oil, preferably after cooling, is returned to the condenser to repeat the described cycle.

It is obvious that there are a number of fundamental differences between what happens in the zones of contact of feed gas and absorption oil in a conventional absorber and what takes place in the tower of my system. In the conventional absorber there is a rise in the temperature to a point above the mean temperature of the oil and the gas. The highest temperature is often found in the upper part of the absorption zone, not far down from the point of entrance of the absorption oil or near the point of entrance of the feed gas. Stabilization of the bottom product is therefore not feasible, since an increase in the temperature at the bottom would result in a rise in the temperature near the top, which would either cause the loss of liquefiable components of the gas or require a much higher ratio of oil to gas to prevent such a loss. In contrast to the above, in my column usually there is a gradual decline in the temperature from bottom to top. The amount of the dissolved gas in the absorption menstruum remains substantially the same throughout the absorber, whereas its composition changes due to absorption of less volatile gas components and displacement of more volatile gas components. Stabilization becomes feasible, because a rise in the bottom temperature can be counteracted by a reasonably small increase of the natural reflux, which by its partial vaporization keeps the top temperature at its low level.

In the following example the relative efficiency of my process is compared with that of a conventional absorber, in which lean absorption oil is fed to the top plate. A gas from a Dubbs cracking unit containing about 2% pentanes and heavier was so processed to recover 99% thereof. The following table indicates the relative proportions of lighter than pentane hydrocarbons which were recovered in conjunction with the pentane:

*Percent recovered*

| Hydrocarbon | Shiras process | Conventional absorber |
| --- | --- | --- |
| Pentanes and heavier | 99 | 99 |
| Butanes and butylene | 38 | 38 |
| Propane and propylene | Trace | 13 |
| Ethane and ethylene | | 3.7 |
| Methane | | .6 |

It is to be noted in the above comparative example that the gasoline produced by my process is well stabilized, while that from the conventional absorber is very "wild."

It is obvious that for the purpose of effective absorption and stabilization a quantity of natural reflux above a certain minimum must be supplied. This minimum can be estimated if the compositions of the wet gas and of the absorption oil are known. The column and the condenser should be operated under such temperature and pressure conditions, to enable the production of a sufficient amount of natural reflux with a minimum amount of absorption oil, high pressure and low temperature at the condenser outlet resulting in a high ratio of natural to total reflux.

The pressures which I apply are usually substantially equal to the pressures of the wet feed gases at their source, and although generally super-atmospheric pressures are of advantage, the cost of compression to very high pressures may not be warranted.

The circulation of a minimum amount of absorption oil is desirable to minimize pumping and distillation costs.

Below is an example of how to estimate the required natural as well as total refluxes.

It is evident that, for taking full advantage of this invention, the latent heat of vaporization of the natural reflux must be at least as great as the latent heat of vaporization of the condensable components of the wet feed gas. Assuming equal molal heats of vaporization for the various components in the gas, it follows that the minimum molal quantity of natural reflux which is required, is equal to the molal quantity of condensable components in the feed gas. This minimum is sufficient to condense said condensable components but is insufficient to have any effect on the stabilizing zone, an excess over this minimum being required for stabilization.

Thus it is seen that the minimum of the required natural reflux equals the wet gas feed, F, minus the dry overhead gas, D. If we assume that the composition of the gas be such that one mol. of dry gas, D, is produced from 1.7 mol. of feed gas, F, and that the pressure and temperature conditions at the condenser outlet, as well as the composition of the dry gas be such, that the fat absorption oil comprises 52 mol. percent of absorbed components, we have the following conditions:

Natural reflux, N=.52 total reflux, R,
N must be greater than F—D
.52 R. must be greater than .7 mol./mol. D.
R must be greater than 1.35 mol./mol. D This means that the ratio of total reflux to withdrawn product, i. e., reflux ratio, must be greater than 1.35:1, in order to have an excess reflux available for the stabilizing zone.

A considerable saving of reflux can be achieved by partly condensing the wet gas prior to admittance to the column. If, for instance, in a condenser situated between the source of the feed gas and the column, 20% of the gas, such as in the above mentioned example, is condensed, .34 mols of liquid is eliminated for every mol. of dry gas and the remaining wet gas amounts to 1.36 mols per mol. of dry gas. Repeating the above calculations, it is found that the reflux ratio must be greater than .69:1. Thus only half the amount of absorption oil need be circulated as compared with that of the first example.

Further advantages of the invention are apparent from the following description of the attached drawing, representing a flow diagram of the new process.

Wet feed gas from a source not shown is conducted through line 1, condenser 2 or by-pass 3, into column 4. The point of entrance 5 of the feed gas is intermediate between top and bottom of the column. The gas rises through the bubble plates 6 which may be of any efficient conventional design and top gas leaves through vapor line 7. At point 8 of line 7 lean absorption oil is admixed to the gas. The resulting mixture is conducted through a water-cooled condenser 9 and through gas separator 10. Oil with the gas absorbed at the temperature of condenser 9 is withdrawn by way of a conical bottom 11 of separator 10 and proceeds through a gooseneck 12 to the top plate 13 of column 4. Dry gas from the separator leaves through exit line 14. As the saturated absorption oil descends over the bubble plates 6 in countercurrent to the rising gas, lighter hydrocarbons dissolved in the absorption oil are exchanged for heavier ones. The zone in column 4 below the point of entrance 5 of the feed gas, represents a stabilizing zone. Heat is provided by reboiler 15 located near the bottom of the stabilizing zone, said heat causing the evaporation of the lighter absorbed hydrocarbons. Stabilized fat absorption oil is drained through bottom line 16 and valve 17 to be stripped in a separate distillation unit, comprising a column 18 with heating coil 19 near its bottom, vapor line 20 and condenser 21 for overhead products, which after leaving the condenser go to storage as recovery gasoline. Steam may be introduced through line 26 to facilitate the stripping operation. The bottom product proceeds through line 22 or cooler 23 to be picked up by pump 24 and returned to point 8 in vapor line 7 of the absorption system.

It is understood that the equipment as described does not represent the only type of apparatus in which my invention can be carried out. For instance the absorption and stabilizing section may be embodied in separate structural units; or the condenser and separator may be a structural part of the absorbing and condensing unit. Furthermore, the condenser can be such that absorption oil and gas meet in countercurrent rather than concurrent flow although admittedly the method substantially as shown is the preferred one.

I claim as my invention:

1. In the continuous ebullient fractionation of vapors containing normally gaseous and liquefiable components to produce a normally gaseous overhead and a liquid bottom product, the method of providing natural reflux comprising flowing the overhead gas and an absorption menstruum for the said vapors concurrently through an externally cooled zone simultaneously to absorb a portion of the gas in said menstruum and to withdraw heat of absorption from the menstruum, separating unabsorbed gas from the cooled menstruum and flowing the cooled menstruum containing absorbed gas countercurrently against said vapors through a fractionating zone.

2. In the continuous ebullient fractionation of vapors containing normally gaseous and liquefiable components to produce a normally gaseous overhead and a liquid bottom product the improvement comprising flowing the overhead gas and an absorption menstruum for said vapors concurrently through an externally cooled zone simultaneously to absorb a portion of the gas in said menstruum; and to withdraw heat of absorption from the menstruum, separating the unabsorbed gas from the cooled menstruum, flowing the cooled menstruum containing absorbed gas in countercurrent to said vapors in a fractionating zone under conditions to produce the overhead gas substantially free of liquefiable components and a fat menstruum containing substantially all of the liquefiable components and a portion of the normally gaseous components of said vapors, subjecting the fat menstruum to fractional distillation under conditions to separate therefrom substantially only the excessively volatile components, and combining said separated components with the vapors to be treated.

RUSSELL NORMAN SHIRAS.